June 5, 1934. G. C. BEIDLER 1,962,050
ATTACHMENT FOR PHOTOGRAPHIC PRINT TREATING APPARATUS
Filed Nov. 14, 1932
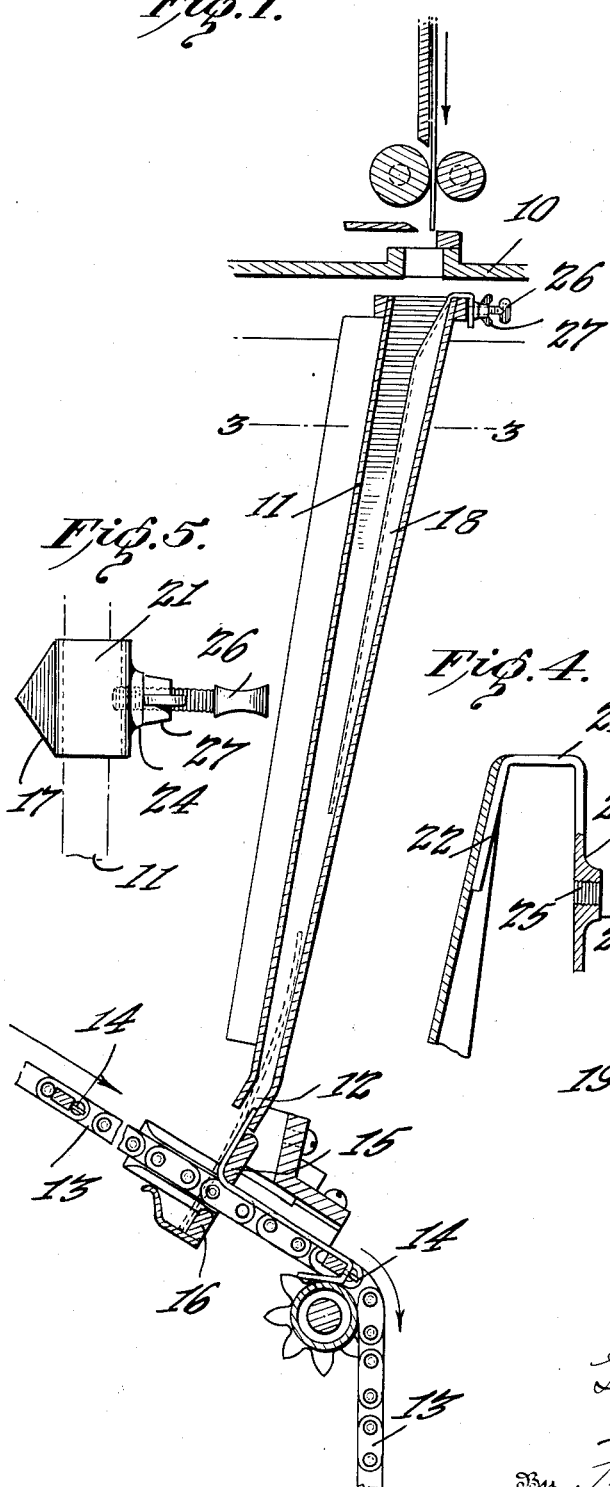
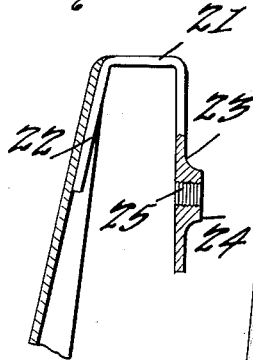
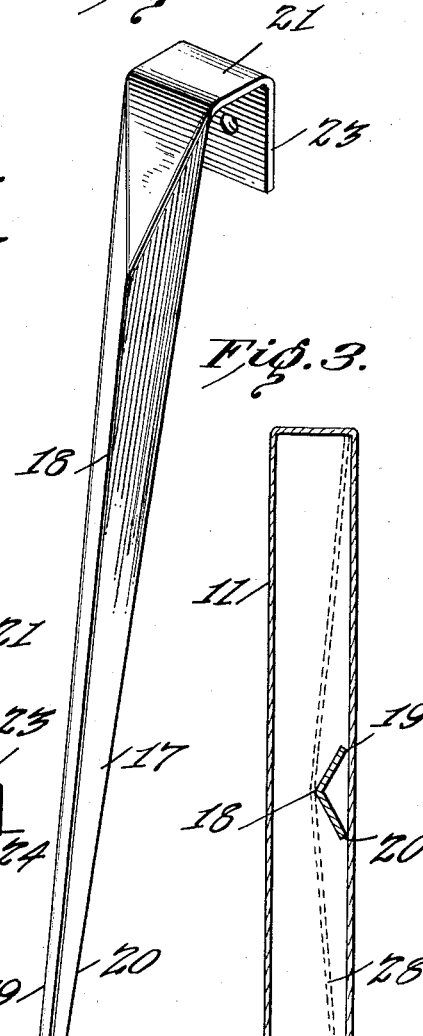
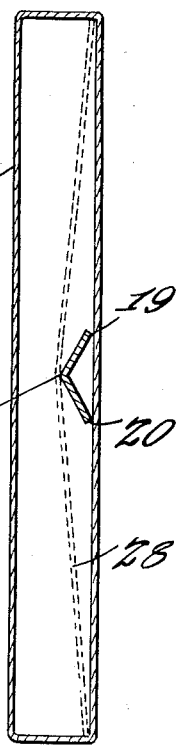
Inventor,
George C. Beidler,
By Frank S. Appleman,
Attorney.

Patented June 5, 1934

1,962,050

UNITED STATES PATENT OFFICE 1,962,050

ATTACHMENT FOR PHOTOGRAPHIC PRINT TREATING APPARATUS

George C. Beidler, Rochester, N. Y.

Application November 14, 1932, Serial No. 642,656

4 Claims. (Cl. 271—63)

This invention relates to photographic print-treating apparatus, and particularly to machines designed for transferring flexible film, such as sensitized paper, from one part of an apparatus to another; the said invention having for its object the provision of means for bending or buckling the paper transversely of the direction of its movement, in order to reduce the tendency of the film to curl, which tendency is inherent in sensitized paper or flexible elements which have been wound in roll form and which is drawn from the roll for use, as is done when the film is passed through an exposing chamber, or conveyed through apparatus intended to treat the film as where it is developed, fixed or otherwise subjected to a finishing treatment.

It is an object of this invention to provide a device which will cause the film to bow or bend transversely of its direction of movement; and furthermore, to provide novel means whereby a device having the function just mentioned may be applied to a chute, guide, or other instrumentality through or along which film is transferred from one part of an apparatus to another, it being the purpose of the inventor that the coiled film shall be restrained from curling after it has been drawn from the roll and is in transit to other parts of the apparatus.

In particular, the invention constitutes an improvement which may be attached to and project within the so-called "chute", an example of which is found in U. S. Patent No. 1,822,345 of September 8, 1931, and devices of like or other character, to which the invention may be applied and in connection with which it will operate.

In the chute of the aforesaid patent, film which is transferred to it has a tendency to coil and, as the advanced end of the said film reaches the restricted lower portion of the chute, the engagement of the film with the inner walls of the chute retards the movement of the film and the film has a tendency to coil on itself to a degree which impairs the operation of the machine. It is therefore an object of this invention to prevent the film from curling to a degree which will retard its movement in the chute, yet permitting the advanced end of the film to retain a certain degree of its curve or coil as it issues from the lower end of the chute in order that it will be in better position to be caught by the parts of the conveyer intended to engage it in apparatus of this character. It is of course known that some of the conveying instrumentalities have pins that are intended to penetrate the film, so that the film will be transferred by the carrier or conveyer, whereas other embodiments of conveyers have blades or bars around one edge of which the film is folded and held while the film is being drawn. An example of this latter instrumentality is found in U. S. Patent No. 1,877,659 of September 13, 1932.

It is an object of the invention furthermore to provide a device of the character indicated which can be readily applied to or removed from a chute, the said device being simple in its construction and comparatively inexpensive.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a sectional view of film feeding means and a chute through which the film is to be transferred and held in such relation to the conveyer that it may be engaged thereby and drawn from the chute;

Figure 2 illustrates a perspective view of the attachment for flexing the film;

Figure 3 illustrates a sectional view of the chute on the line 3—3 of Fig. 1, the portions of the chute and flexing device below the line being omitted;

Figure 4 illustrates a sectional view of the upper end of the attachment; and

Figure 5 illustrates a plan view thereof.

In this drawing, the portion of the apparatus above the element 10 is a conventional illustration of film drawing and severing means such as is employed for photographing commercial papers and the like. 11 denotes a chute having its upper end in such proximity to the film feeding means as to receive film issuing from that part of the apparatus indicated by the reference character 10, it being shown that the chute is tapered in width toward its lower end, and that it has a restricted exit opening 12 through which film escapes. A conveyer chain 13 has a prong or spur 14 which penetrates the film and a number of such pins or prongs are employed transversely of the conveyer in practice so that the film is supported at a number of points throughout its width. It is the purpose in the apparatus shown that the advancing end of the film shall pass below the opening between the elements 15 and 16, between the edges of which the conveyer chain travels so that the instrumentalities carried by the chains for engaging the film may have an opportunity to hold the film just above its lower advanced edge and it is desirable that there shall be a certain amount of curve in that portion of the film when it is engaged by the conveyer.

In order to restrict the curling tendency of the film a breaker bar or arm 17 is applied to the chute and it extends downwardly therein from approximately its mouth. The bar or arm has an outer surface inclined from a central rib-like portion 18 to its edges 19 and 20, and the said arm is also tapered in width and depth from its upper to its lower end, for a purpose to be presently explained.

An inverted U-shaped plate 21 has one leg 22 secured to the arm and the other leg 23 is provided with an apertured boss 24 internally threaded as at 25 to engage the threads of a clamping screw 26 which also is supplied with a jamb nut 27 adapted to be forced against the outer face of the boss to prevent loosening of the clamping screw.

When the device is in use, film 28 in the chute will be transversely buckled or bent approximately as illustrated in Fig. 3, or the proportions of the device may be such that the film will be buckled to a greater or lesser degree, according to the requirements in practice, but it is the purpose of the inventor that the transverse curvature of the film shall be such that its advancing end will not curl to an extent which will retard its movement in the chute. Owing to the tapered formation of the arm 17, the degree of flexing of the film is reduced and minimized when the end of the film reaches the end of the arm and thereafter the film regains a slight curl as is passes the end of the said arm. As a result of the engagement of the end of the film with the inner wall of the chute, it is restrained from further curling and permitted to slide down the chute until it escapes at the lower end where it assumes a position between the members 15 and 16 and is subject to the action of the conveyer as heretofore stated.

I claim:

1. In a film treating apparatus, an instrumentality tapered from the end in which a film is received to the end from which the film is discharged, through which film is moved, a film flexing element in the said instrumentality elongated in the direction of movement of the film therein for flexing the film transversely of the direction of movement of the film in the instrumentality, the said element being tapered to such a degree that its flexing edge is substantially the same distance from the internal wall of the instrumentality at any point throughout its length, and means below the said instrumentality for grasping the film issuing therefrom and conveying it.

2. In a film treating apparatus, a tapered chute in which film is moved edgewise, a film flexing element therein elongated in the direction of travel of the film, and means for attaching the flexing element in the film entrance end of said chute, said film flexing element comprising a tapered body extending toward the central portion of said chute and forming a rib over which the film is flexed transversely of its direction of movement.

3. In a film treating apparatus, a tapered member in which film is moved edgewise, a film flexing element therein elongated in the direction of travel of the film, and means for attaching the flexing element in the film entrance end of said member, said film flexing element comprising a body tapered toward its inner end and extending toward the central portion of said member and forming a rib over which the film is flexed transversely of its direction of movement, the taper of the film flexing element corresponding substantially to that of the first mentioned member.

4. In a film treating apparatus, a member in which film is moved edgewise, a film flexing element therein elongated in the direction of travel of the film, and means for attaching the flexing element in the film entrance end of said member, said film flexing element comprising a body approximately angular in cross section and tapered toward its inner end and extending toward the central portion of said member and forming a rib over which the film is flexed transversely of its direction of movement.

GEORGE C. BEIDLER.